United States Patent
Robertson

[11] 3,882,444
[45] May 6, 1975

[54] STEERABLE PARAMETRIC CONVERSION ARRAY

[75] Inventor: Thomas M. Robertson, Silver Spring, Md.

[73] Assignee: Automation Industries, Inc., Silver Spring, Md.

[22] Filed: June 18, 1971

[21] Appl. No.: 154,501

[52] U.S. Cl............ 340/3 C; 340/5 T; 340/15.5 CC; 343/17.5; 181/110
[51] Int. Cl.............................................. G01s 9/66
[58] Field of Search............ 340/3 R, 3 A, 3 C, 5 T, 340/7 PC, 15.5 CC, 15.5 TC; 343/17.5; 181/110, 139

[56] References Cited
UNITED STATES PATENTS
3,337,870  8/1967  Allen et al. .................... 343/17.5

Primary Examiner—Maynard R. Wilbur
Assistant Examiner—N. Moskowitz
Attorney, Agent, or Firm—Jones, Tullar & Cooper

[57] ABSTRACT

A system for detecting and isolating incoming acoustic waves is disclosed, the system including means for transmitting a random noise signal which will intersect the incoming waves. Cross modulation products, particularly the first order sum and difference frequencies, occurring in the volume where the incoming low frequency and transmitted high frequency signals meet and intersect are propagated back toward a receiver where the modulated noise signals are correlated with the transmitted noise signal to isolate the lower frequency incoming signal. The interaction between the transmitted and incoming signals takes place at a plurality of volumetric segments which are located at various distances from the transmitter. By correlating the modulated return signals, which are received at selected intervals, with properly delayed replicas of the transmitted signal, the interaction, or cross modulation products, at any selected range can be isolated in the receiver. By summing these isolated signals, the incoming frequency can be detected, the overall system acting as a virtual receiving array.

15 Claims, 2 Drawing Figures

3,882,444

STEERABLE PARAMETRIC CONVERSION ARRAY

BACKGROUND OF THE INVENTION

The present invention relates, in general, to systems for receiving acoustic signals from a source remote from the receiver, and more particularly to means for increasing the selectivity of such a system by creating a virtual array having a high degree of directivity whereby the source of the incoming waves can be accurately located.

As is well known in the art, when an acoustic wave signal is propagated through a medium such as water, losses due to the scattering effects of the medium are a serious problem. Further, a great deal of noise is generally present along with such signals, the noise being generated by shipping, marine life, motion of the water, reflections, echoes, and the like, and this serves further to obscure the signal which is to be received. Because of these factors, it becomes very difficult not only to distinguish the existence of an information carrying signal, but also to detect with accuracy the direction in which it is propagating; i.e., to locate the direction of its source. In the prior art, these difficulties have been overcome in part by the use of large arrays of receiver transducers which all assist in receiving the signal and which are so arranged as to be highly directional in their sum total response. Such arrays permit incoming signals to be detected and their direction to be determined, but present numerous difficulties. In particular, in order to obtain adequate directivity at low frequencies the array must be very large, making it difficult to set up and virtually requiring a permanent installation.

It has been proposed to eliminate the need for such transducer arrays by taking advantage of certain known characteristics of acoustic waves; i.e., that where two acoustic pressure waves propagate simultaneously in the same volume of water, the interaction between the two waves will cause cross modulation products of the two signals to be formed. These products are due to the slight non-linear compressibility of water, the effect being enhanced if the water contains free gas bubbles. Thus, when an incoming acoustic pressure wave is to be detected, it has been suggested that the system be provided with means for transmitting a relatively high frequency acoustic wave in the general direction of the source of the waves that are to be detected. Where the transmitted signal is a sine wave of a frequency $f_t$, the incoming wave to be received is of a lower frequency $f_s$, and the two signals impinge on a small volume segment of water, cross modulation signals of frequencies $f_t + f_s$ and $f_t - f_s$ will be radiated in all directions from the small volume element. The higher frequency signal $f_t$ can be considered as a carrier that is modulated by the lower frequency signal $f_s$, with the sum and difference signals forming side bands to the carrier.

A portion of the carrier plus the sum and difference cross modulated signals will be backscattered by the water and impurities in the small volume elements under consideration, and thus will be radiated in the direction of the carrier source. Although in theory there would be no resultant signal returned to the carrier source in a pure water medium with a uniform carrier intensity because of the phase differences in the acoustic waves backscattered from discrete small volume elements at different distances from the receiver, in actuality it is possible to obtain a net modulated carrier signal propagating in the direction of the carrier source. Theoretically, each return wave would have an equal but opposite return wave being radiated by another volume segment, and these would cancel each other. However, because of inhomogeneities in the water, intensity variations due to differences in distance to various volume segments, and the random nature of the backscattering, there is not a complete cancellation of the returning signals, and a net signal can be received. This net signal may then be demodulated at the receiver and the incoming low frequency signal recovered. Each volume segment which backscatters a recoverable signal may then be considered to be an individual array transducer element, and the total recoverable signal may be said to be due to a plurality of such elements forming a virtual array. This arrangement of virtual transducers acts as a highly directional end fire array for reception of the incoming low frequency signal; however, with the described sine wave transmission the receiver is only responsive to the resultant sum signal and there is no practical way to develop split beams for cross correlation signal processing or to perform beam steering. Since the backscattered acoustic sine wave carrier is algebraically additive, no distinction can be made of signals backscattered from different volume segments at discrete distances from the transmitter, and such devices are sensitive in only one direction. Thus this approach, although representing an improvement in the recovery of incoming signals, nevertheless has practical limitations which restrict its use.

SUMMARY OF THE INVENTION

It is, therefore, an object of the present invention to provide a system for receiving low frequency acoustic pressure wave signals from a source, and for determining the direction of that source.

It is a further object of the present invention to provide a system for receiving relatively low frequency acoustic signals by propagating relatively high frequency acoustic signals in the opposite direction and receiving the cross modulation products due to the interaction of the two signals where they intersect in a given volume of water.

It is a further object of the present invention to utilize the phenomenon of the cross modulation of two acoustic pressure waves which are propagating simultaneously in the same volume of water to produce a virtual receiver array for reception of an incoming low frequency signal.

It is another object of the present invention to utilize the cross modulation products formed by the propagation of two acoustic waves in a selected volume of water, the cross modulation effects being used to create a virtual receiver array by which the incoming signals can be received and the direction of their source be accurately determined.

It is another object of the present invention to provide a virtual receiver array which is highly directional and wherein the direction of maximum response may be varied.

A further object of the present invention is the provision of a virtual array which is not limited as to its direction of maximum response, but which permits simultaneous and independent spatial sampling of an incoming low frequency signal whereby the direction of maximum response may be varied and where the phenomenon of cross modulation can be employed to receive incoming acoustic signals.

An additional object of the present invention is to provide a system for receiving incoming acoustic waves and for determining the direction of the source of such waves by transmitting high frequency random noise signals which will interact with the incoming signal to produce backscattering in the direction of the carrier source, the random noise signal constituting a carrier for the cross modulation products in the return signal.

It is another object of the present invention to provide a virtual end fire receiver array system through the use of a transmitted random noise carrier signal which interacts with an incoming acoustic pressure wave signal that is to be received, the system being operative to sample multiple points within the zone of interaction between the two wave signals.

An additional object of the present invention is the provision of a virtual array system for receiving relatively low frequency acoustic pressure waves, the system including a random noise carrier signal generator and means for transmitting the carrier in a direction to interact with the incoming signal in such a way as to permit simultaneous and independent sampling of the incoming signal at multiple points within the interaction zone.

An additional object of the present invention is the provision of means for detecting low frequency acoustic pressure signals by means of a virtual array created by the transmission of random noise carrier signals which intersect and interact with the incoming signals, producing cross modulated backscattered signals which may be received at a receiver, the received signals being of such a nature as to permit simultaneous and independent sampling of the cross modulation products generated at multiple points within the interaction zone, and the receiver including means for processing the received signal so as to permit beam forming and resultant variable directionality in the virtual array.

Briefly, the foregoing is accomplished by providing an acoustic wave generator at a base location which is adapted to project a bandlimited, high frequency random noise carrier in the direction of interest. A low-frequency signal from a remote source propagating generally in the opposite direction will interact with the noise signal to produce cross modulation products, with the random noise signal serving as a carrier, and the cross modulation producing sum and difference frequency signals as side bands to the carrier. The carrier and the various cross modulation components will be scattered from discrete locations within the zone of interaction, these discrete locations being referred to as segments of the volume of interest. Each such segment will scatter a portion of the carrier and the cross modulation products in all directions, and some of these signals will be backscattered toward a receiver which may be located adjacent the noise signal transmitter.

The time required for the carrier wave to travel from the noise projector to a selected segment and back to the receiver requires a time $t$. Thus, the carrier and the cross modulation components scattered from this selected segment will reach the receiving transducer at a time after the carrier (noise) components have been transmitted. This delayed return signal may be correlated with a suitably delayed replica of the transmitted signal, and the resultant output of the correlator will contain the low frequency signal that interacted with the carrier at the selected volumetric segment. Since only the cross modulation components from the interaction zone corresponding to delay of $t$ will be coherent with the delayed replica of the transmitted signal, because of the random nature of the transmitted wave, the backscattered signals from other discrete segments will be rejected by the correlator and the low frequency signal at the selected segment will be avialable. The same process is repeated for other delay times, with a correlator being provided for each such delay time to thereby provide a plurality of output signals which represent a sampling of the incoming low frequency signal at selected segments in the interaction zone. These samples are then combined to provide a single output representing the incoming signal received by the virtual array, which may be considered to be a low frequency directional listening beam. Beam steering can be accomplished by providing suitable delays in the correlator outputs prior to their combination, in accordance with known beam steering techniques, whereby the virtual array will have maximum response to a signal from any selected direction, permitting the system to be used in determining the direction of the source of the incoming signals.

The virtual array of the present invention may also be used in a split beam signal processing system in order to obtain the cross correlation gain inherent in such systems. With this arrangement, two systems of the type just described will be employed, with the transmitting noise signal projectors forming diverging beams which may then each be controlled in the manner above described to have their maximum response to a signal from a selected common direction. These two systems permit the formation of independent left and right receiving channels necessary for cross correlation signal processing.

BRIEF DESCRIPTION OF THE DRAWINGS

The foregoing and additional objects, as well as the various novel features which are characteristic of the present invention, will be understood more clearly and fully from the following detailed description and from the recital of the appended claims, taken in conjunction with the accompanying drawings, in which:

DESCRIPTION OF PREFERRED EMBODIMENTS

Figure 1:
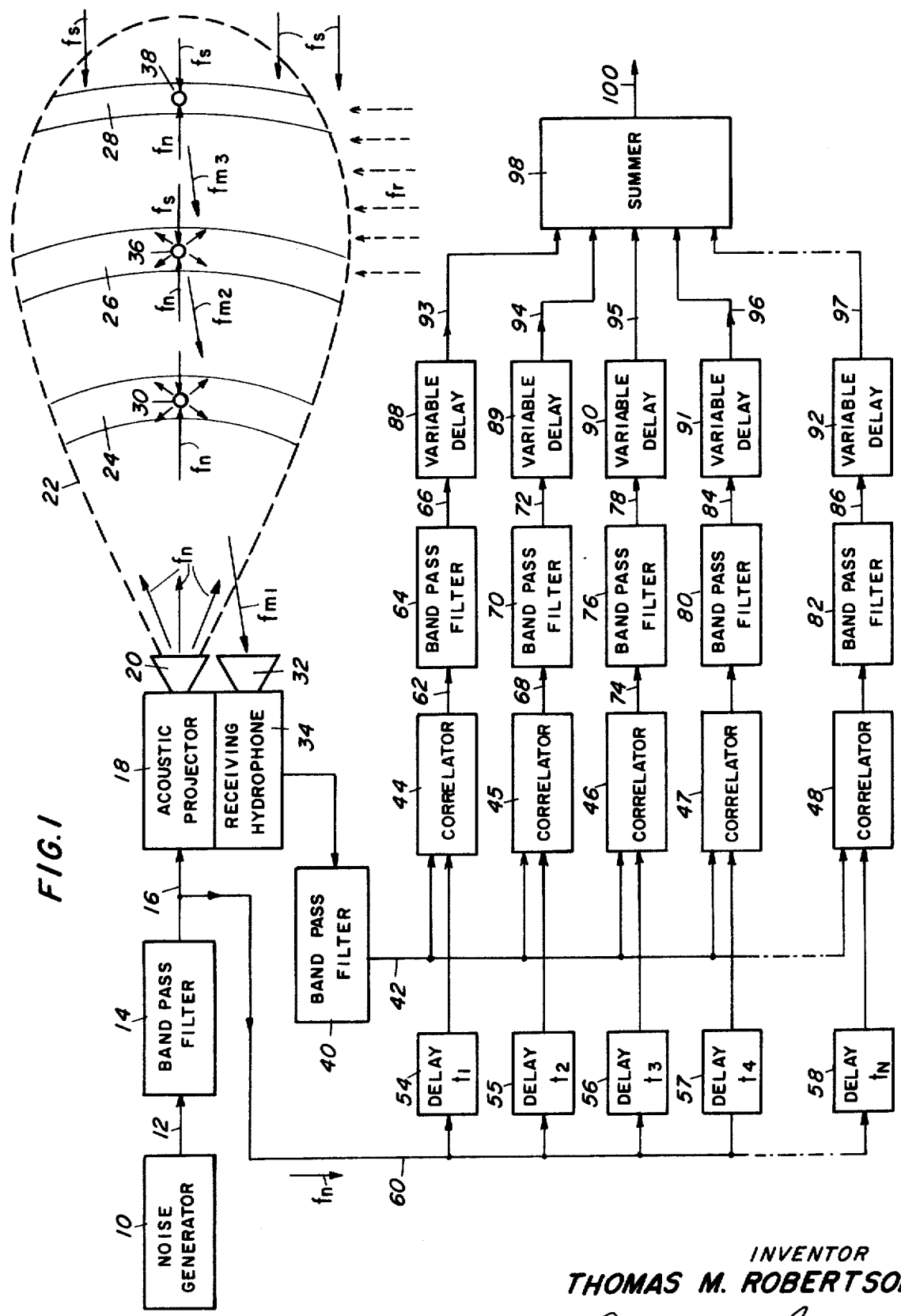
FIG. 1 is a block diagram of the system of the present invention, including a diagrammatic illustration of the manner in which the system operates to provide a virtual array.

Turning now to a consideration of FIG. 1, there is illustrated in the system of the present invention a noise generator 10 which produces an acoustic signal for transmission in accordance with the present invention. The noise generator produces "white noise" having a wave form which varies in amplitude and frequency components in a random or a pseudo-random manner to produce a non-repetitive signal, in a wellknown manner. The output from this generator is fed by way of line 12 to a band-pass filter 14 and thence by way of line 16 to a conventional acoustic projector 18 including a transmitting transducer 20. The acoustic projector 18 and transducer 20 serve to transmit a band-limited high frequency, random noise carrier signal $f_n$ in the direction of interest. The wave $f_n$ is projected in a medium such as water, with the signal forming an intensity pattern, or listening beam, the outline of which is diagrammatically indicated at 22.

The outwardly traveling acoustic waves of the radiated signal $f_n$ intercept and interact with the incoming waves of a low frequency acoustic signal $f_s$ which is to be received. The incoming and the projected signals will propagate simultaneously through the volume encompassed by the radiated listening beam 22, the waves interacting at discrete points throughout the volume and producing at each such point cross modulation components. Where the incoming waves approach transducer 20 in a direction generally opposite to the direction of travel of the projected listening beam, the signals $f_n$ will interact first with the leading edge of the incoming waveform $f_s$ and subsequently will interact with the remainder of the signal as the radiated waves move outwardly. In similar manner, the leading edge of the incoming waveform $f_s$ will first interact with the leading edge of the radiated noise signal $f_n$ and the thereafter with following portions of the radiated signal. The interaction between the two waveforms thus occurs throughout the effective volume of the beam 22, with various portions of the signal $f_n$ interacting simultaneously with various portions of the incoming signal $f_s$ at different distances from the acoustic projector.

For purposes of illustrating the present system, three segments of the volume of interaction defined by the limits of beam 22 will be considered, and it will be assumed that the signal which is to be received is a repetitive signal. The three segments are identified at 24, 26 and 28, with each segment being relatively narrow with the points of interaction within each segment being substantially equidistant from the acoustic projector and transducer 20. The signal transmitted by transducer 20 may be considered a continuously varying carrier signal which will travel outwardly from the transducer 20 in a diverging pattern and at some distance from the transducer will encounter at segment 24 a selected portion of the incoming signal $f_s$. At a plurality of points throughout the segment 24, such as the illustrated point 30, waves $f_n$ and $f_s$ will interact with each other to produce cross modulation products which will be radiated from that point in all directions. Some of these radiated cross modulation products will be directed toward a receiving transducer 32 forming a part of a receiving hydrophone 34 and located adjacent the transducer 20; others will be radiated in other directions and be lost to the present system. The cross modulation products returned to the receiver from point 30 are indicated at $f_{m1}$ and this waveform includes the frequency components $f_n$, $(f_n + f_s)$, and $(f_n - f_s)$. Each point within the segment 24 will return a similar backscattered modulation product $f_{m1}$, and all return signals from the segment will be in phase. Since segment 24 is selected as being a section of a sphere having as its center the transducer 20, all points in the segment will be equidistant from the projector, and the return signals from all parts of the segment will represent the interaction of substantially the same portion of the radiated signal with the incoming signals. The receiving transducer 32 is placed adjacent the projector transducer 20 so that it will be substantially equidistant from all points in the segment and will receive the return signals therefrom substantially in phase for practical geometrics. If a sound wave requires a time $t_1$ to travel from the transducer 20 to the interaction zone 24 and back to the receiving transducer 32, then the received carrier has been delayed by that time $t_1$ and the segment 24 corresponds to such a delay. In practical applications of the system there will be restrictions placed on its actual geometry by the values of the frequency, or wavelength, of the incoming signal, by the direction of its source, and by the beamwidth of the transducers used.

If the projected signal $f_n$ continues past segment 24 to a discretely spaced second segment 26, it will there interact with a different portion of the incoming signal $f_s$ at, for example, an interaction point 36. If the incoming signal $f_s$ is a repetitive signal, the location of the second zone 26 may be so chosen that the cross modulation products produced at point 36 will be substantially identical to those produced at point 30, although reduced in intensity. The cross modulation products backscattered toward receiving transducer 32 from segment 28 are indicated by the arrow $f_{m2}$. If the second volume segment 26 is located an even number of wave lengths of the incoming signal beyond the segment 24, then the interaction of waves $f_n$ and $f_s$ at point 36 will produce return waves which will be in phase with the return signals $f_{m1}$ from segment 24. Similarly, if the third volume segment 28 is properly located, the interaction of waves $f_n$ and $f_s$ at point 38 in that segment will produce cross modulation components $f_{m3}$ which will be backscattered to the receiving transducer 32 in phase with the return modulated waves $f_{m1}$ and $f_{m2}$. These return waves each include the frequency components $f_n$, $(f_n + f_s)$, and $(f_n - f_s)$, the frequency $f_n$ serving as a carrier for the sum and difference signals which appear as side bands to the carrier.

It will be apparent that the backscattering effect is not limited to volumetric segments spaced by even wave lengths, but that the interaction between the listening beam and the incoming signal to be detected occurs throughout the interaction zone roughly defined by the beam outline 22. However, the receiver is made sensitive only to the selected segments of the interaction zone in the manner to be described, and by properly spacing these segments, maximum sensitivity is attained. These segmments thus act as effective listening transducers located in the medium in front of and spaced from the acoustic projector, but since no receiver transducers are physically located at these spots, the segments may be said to form a virtual receiver array.

The return cross-modulation product signal $f_m$ are fed by the receiving hydrophone 34 through a band-pass filter 40 and thence by way of line 42 to a plurality of correlators 44–48. These correlators, are conventional devices known in the art, such as the Time/Data 100 data processor manufactured by the Time/Data Corporation, 490 San Antonio Road, Palo Alto, California, are connected in parallel to line 42 and simultaneously receive the output signal from band-pass filter 40. Also connected to each correlator and providing an input thereto is a corresponding one of delay circuits 54–58. The input to these delay circuits is provided by the noise generator 10 through lines 16 and 60, the delay circuits all being connected in parallel to line 60 so as to receive simultaneously the output of the noise generator. The delay time of each of networks 54–58 is selected so that each one of the networks corresponds to one of the segments of interaction and to the return signal $f_m$ that is backscattered therefrom. Thus, if the transmitted noise signal $f_n$ requires a time $t_1$ to travel from transmitter 20 to segment 24 and back to receiver 32, then the delay time of delay network 54 is selected to be $t_1$. The output from delay network 54 will be a replica of the transmitted frequency $f_n$, delayed by a time $t_1$, and this replica will be coherent with the $f_n$ component in the return signal $f_{m1}$. By feeding $f_{m1}$ and the replica of $f_n$ delayed by time $t_1$ to the correlator 44, the correlator will operate in known manner to eliminate the carrier component from the return signal and will produce at its output on line 62 a dc term and a replica of the incoming signal. This signal may then be fed through a band-pass filter 64 whereby the incoming signal alone will appear on line 66. It will be seen that only those received signals on line 42 which contain a noise signal $f_n$ coherent with the delayed replica of the noise signal from delay network 54 will be passed through correlator 44; signals containing nonchoherent noise components will be rejected, and the output from correlator 44 will correspond to the incoming wave characteristic at segment 24 only.

The modulated signal $f_{m2}$ returned from volume segment 26 is received by transducer 32 at a time $t_2$ after the waveform of $f_n$ has been transmitted. This waveform is applied by way of line 42 to the inputs of all of the correlators 44–48 at the same time that the delay network 55 is producing a replica of the noise signal $f_n$ delayed by a time $t_2$. This delayed replica is applied to the input of correlator 45 simultaneously with the signal $f_{m2}$ and the correlator will respond to the coherent noise component to produce on line 68 a dc term and the incoming signal from segment 26 only. Since none of the other delay networks are producing at this time the replica of the carrier component contained in the received signal $f_{m2}$, only correlator 45 will produce an output which, after being fed through band-pass filter 70, will provide on line 72 the incoming signal which has been backscattered from segment 26.

In similar manner, the return signal $f_{m3}$ from segment 28 will be received by transducer 32 at a time $t_3$ after the projection of the noise waveform $f_n$, and this component of the received signal will, therefore, be coherent with the output from delay network 56. These two signals will then be matched in correlator 46 to produce on line 74 a dc component and the incoming signal contained in the waveform $f_{m3}$ which, after being fed through filter 76 will produce on line 78 the incoming signal $f_s$. Each of the delay networks 57 and 58 will in turn produce replicas of the noise signal $f_n$ which may be correlated in networks 47 and 48 with received modulated signals from corresponding segments (not shown) and which, after filtering in their corresponding band-pass filters 80 and 82, respectively, will produce on lines 84 and 86 the incoming signals as sampled at segments corresponding to the delays of networks 57 and 58. Any number of delay networks and correlators may be provided, as indicated by the breaks in lines 42 and 60, with the delay network 58 producing a delay time $t_n$ corresponding to the most distant segment that is to be monitored.

It will be apparent that the incoming signals appearing on line 66, 72, 78, 84 and 86 may be out of phase with each other because of time delays, due to the differences in distance between the acoustic projector and the various segments of interaction, which cause these signals to be received sequentially. Accordingly, each of these signals is applied through a corresponding one of variable delay networks 88–92 which serve to again delay these signals, but in inverse order, so as to place them in a proper phase relationship. In the described exemplary system, which represents an end fire array where the incoming signals $f_s$ approach the transducer in a direction generally parallel to the axis of listening beam 22, the variable delay networks will all have a zero delay. In this situation, the phase relationships of the received cross-modulation products are esstablished by the time delay circuits 54–58 which determine the spacial segments which are to be monitored so that the resultant outputs from the correlators are in phase and need no further phase adjustment. The selection of these time delays is governed by the same rules that govern conventional array design. However, where the incoming signals approach at an angle to the axis of the listening beam, the phase relationships of the endfire arrangement are not applicable, and the phase relationships must be corrected by means of the variable delay networks 88–92. The outputs of these delay networks are applied by way of lines 93–97 to a summing circuit 98, where the now in-phase signals are added to provide an output line 100 the incoming signal $f_s$.

When the variable delay networks 88–92 are all set to zero, the system has its maximum response in the direction of the axis of the listening beam, and produces a highly sensitive receiver in this direction. In this state, the system has only limited response to incoming signals approaching the projector-receiver in a direction other than along the axis of the listening beam; further, beam steering can not be accomplished in a system so limited. But, because of the fact that separable components can be received from selected segments of the volume of interaction, the separate components can be processed individually in separate channels so as to vary the directional characteristics of the receiving system.

Consider, for example, an incoming waveform $f_r$ which is approaching the transmitted wave beam 22 from an angle perpendicular to the axis of beam 22 rather than from an axial direction as was the case with waves $f_s$. The waveform $f_r$ is indicated by the broken line arrows in FIG. 1. These incoming signals $f_r$ interact with the transmitted noise signal $f_n$ in the manner described above, with the cross modulation products being radiated to the receiving transducer 32, as before. The cross modulation products and the carrier $f_n$ are again applied to correlators 44–48 in parallel, where they are compared to delayed replicas of the noise signal. As before, the received signals $f_r$ from the corresponding segments of interaction of the two waveforms appear on lines 66, 72, 78, 84 and 86. However, the phase relationships between the backscattered modulation products $f_{m1}$, $f_{m2}$, and $f_{m3}$ will be considerably different than they were for the incoming signal $f_s$ described above, for the signal $f_r$ will arrive at all segments dimultaneously rather than sequentially. Therefore, the variable delays 88–92 will have to be adjusted accordingly to account for the varying delays associated with propagation of the cross modulation signals from the various segments to the receiving transducer 32, so that the signals on lines 66, 72, 78, 84 and 86 are in phase when they are applied to the summing network 98. In such a cicumstance the delay network will have a time delay $t_1$, and delay network 88 will have a delay time $t_n$. In similar manner, the delay times of networks 88–92 must be adjusted for an incoming waveform approaching from any other direction so as to insure an in-phase summing operation.

From the foregoing, it will be seen that the segments 24, 26 and 28, and in particular the individual locations 30, 36 and 38 within those segments may be considered to be transducers positioned within the beam 22 and spaced from the projector 22 and receiver 32. These locations exist by virtue of the selected time delays and delay networks 54–58, and thus provide virtual listening transducers at these points. The plurality of listening points from a virtual receiving array, and by adjusting the variable delay networks 88–92 to adjust for varing phase relationships, the array can be made sensitive to incoming waves approaching from any direction, thereby effecting beam steering in the listening beam 22. It should be noted that the segments 24, 26, 28, etc. ideally should be as narrow as possible in order to improve the sensitivity of the device by limiting the response of the system to backscattered or returned modulation products from a very small volume of interaction. To accomplish this, it is necessary to have a wide bandwidth transmitted signal and a wide band receiver; the wider the band of signals that can be received, the narrower will be the segment of the zone of interaction to which it will be sensitive. If the bandwidth of the transmitted signal is zero, that is a pure sine wave, the result would be an infinitely wide volume of response; i.e., all the received signals would be alike, and the receiver would respond to all the input signals at the same time. This is effectively what the prior art provided and this eliminated the ability to monitor selected segments at discrete distances from the receiver. The present invention, on the other hand, uses a wide bandwidth for the generated and received signals, thereby decreasing the width of the segment being monitored, and permitting selection of signals from various segments so as to isolate the cross-modulation products at each.

Although the operation of the system has been described in terms of a repetitive signal for convenience, the operation would be the same for a random input signal $f_s$, and in actual practice this input will be a complex waveform. The segments which are to be monitored by the system will typically be spaced closer than a wavelength of the incoming low frequency signal, the spacing and thus the delay times being determined for the transmitted noise signal. Normally the spacing of the segments will be regular; however, if desired the segments may be spaced arbitrarily and the variable delays adjusted accordingly. The output signals from the variable delays preferably are amplitude weighted in the summer in order to account for intensity variations in the incoming signals and thus in the processed signals due to various factors.

Figure 2:
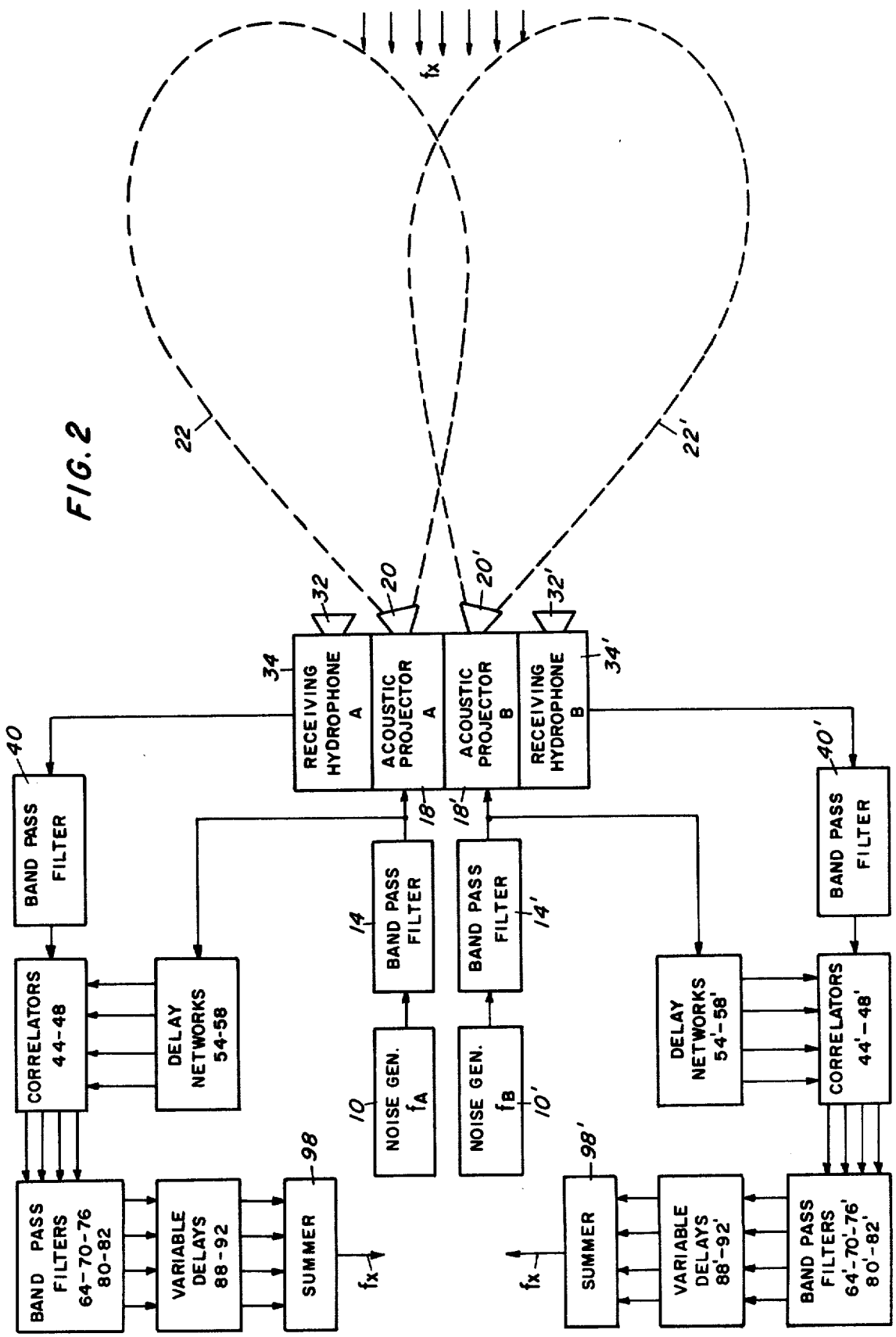
FIG. 2 is a block diagram of a modification of the system.

A further increase in the sensitivity of the present system may be attained by utilizing split beam signal processing, wherein two systems of the type described with respect to FIG. 1 are employed. Such a system is illustrated in FIG. 2, wherein common elements carry similar numbers and wherein the duplicated system is identified by primed numbers. In this case, the noise generator 10 produces a random noise signal at a frequency $f_n$ which is different from the random signal $f_n$ produced by the noise generator 10'. The respective noise signals $f_n$ and $f_n$ are projected by means of transducers 20 and 20' to form listening beams 22 and 22' which are diverging carrier beams. Again, the listening beams will interact with an incoming signal $f_r$ and the cross modulation products will be returned to corresponding receiving hydrophones 34 and 34'. The two signals will be correlated in their respective receiver channels as described with respect to FIG. 1, and will be applied to the variable delays 88–92 and 88'–92', respectively. The variable delays in each channel will then be set to provide maximum sensitivity for the listening beams in the direction of the incoming signal $f_r$. In this manner, the two beams have their maximum sensitivity in a common direction and the use of two separate channels with two separate transmitted signals permits the formation of independent left and right listening beams, giving increased sensitivity and directivity to the system. As is known in split beam signal processing, the use of two independent samples of the incoming signal permits elimination of noise and other interference when the resultant signals from the two channels are cross correlated to provide a single output corresponding to the input waveform $f_r$.

The system of FIG. 1 may further be modified by the use of a focusing type of acoustic projector wherein the sending transducer consists of a plurality of small projectors arranged on a segment of a sphere in a concave configuration. These projectors will provide a listening signal which converges at a distant point, thereby producing a listening beam which reduces the loss and attenuation due to spreading of the beam. Such an arrangement will increase the intensity of the transmitted signal at a distance point to a desired magnitude, which may be in excess of the intensity at intermediate points and will thus provide increased intensity in the return signals backscattered from more remote interaction segments, or monitoring points. Alternatively, the focusing projector may be a suitably phased conformed array instead of a concave spherical array. Further, uniform signal levels from all interaction segments can be achieved by adjusting the gain in each of the correlator channels to compensate for losses due to longer signal paths in the interaction medium.

Thus, there has been described a new and improved method and apparatus for detecting and isolating incoming acoustic wave signals by intercepting these signals with a relatively high frequency listening beam. In order to permit selective reception of the products of interaction between the beams, the listening beam comprises a random or pseudorandom noise acoustic signal, which may be correlated with delayed replicas of itself so that the system will respond to interaction zones, or segments, at selected distances from the transmitter. Although the invention has been described with respect to specific embodiments thereof, it will be apparent to those skilled in the art that various modifications and changes can be made without departing from the true spirit and scope of the invention as described in the following claims.

What is claimed is:

1. The method of detecting and isolating incoming acoustic waves comprising:
   a. generating a substantially random noise signal and projecting said signal in a direction to intersect said incoming waves, said projected signal forming a listening beam which interacts with said incoming waves to produce cross-modulation products;
   b. receiving said cross-modulation products; and
   c. correlating said received cross-modulation products with delayed replicas of said noise signal whereby the cross-modulation products from selected segments of said listening beam are obtained, said selected segments forming a virtual receiving array.

2. The method of claim 1, further including the step of delaying each correlated cross-modulation product by the amount required to insure that said correlated products are in phase, whereby said correlated products can be summed to produce a single output proportional to the said incoming waves.

3. The method of claim 2, wherein the step of correlating said received products with delayed replicas of said noise signal includes the steps of:

a. feeding said generated noise signal in parallel to a plurality of delay networks, each of said networks providing a delay corresponding to the time required for said projected noise signal to travel to a selected segment and back to a receiver, whereby each of said delay networks corresponds to one of said segments;

b. feeding said received cross-modulation products in parallel to a plurality of correlators, each of said correlators receiving a delayed replica of said noise signal from a corresponding one of said delay networks;

c. comparing in each said correlator the noise signal portion of said received cross-modulation products with the noise signal replica from the corresponding delay network; and d. producing an output signal from the correlator in which during a given time period the noise signal portion of the received crossmodulation products is coherent with the noise signal replica being supplied thereto.

4. The method of claim 3, further including the step of delaying by a selected amount the outputs of each of said correlators, whereby said virtual array will have a maximum response to incoming waves from a selected direction.

5. The method of claim 4, further including the steps of:

a. generating a second substantially random noise signal and projecting said second signal in a direction to intersect said incoming waves, said second projected signal forming a second listening beam which diverges from the first said listening beam and which interacts with said incoming waves to produce second cross-modulation products;

b. receiving said second cross-modulation products; and c. correlating said second received cross-modulation products with delayed replicas of said second noise signal whereby the cross-modulation products from selected segments of said second listening beam are obtained, said second selected segments forming a second virtual receiving array, said first and second noise signals thereby permitting split-beam cross-correlation signal processing.

6. A system for producing a virtual array for the detection and isolation of low frequency incoming acoustic waves by intercepting said incoming waves with a high frequency listening beam to produce cross-modulation between said waves and said beam, comprising:

a. means for generating a substantially random acoustic wave noise signal;

b. means for projecting said noise signal in a direction to intersect said incoming waves, said projected signal forming a listening beam defining a volume of interaction wherein the simultaneous propagation of said projected signal and said incoming waves produces cross-modulation products;

c. receiver means for receiving said cross-modulation products, said receiver means including a plurality of correlators;

d. means for feeding said received cross-modulation products simultaneously to said plurality of correlators; and e. means for feeding to each of said correlators a differently delayed replica of said noise signal for comparison to said received cross-modulation products, each of said correlators producing an output signal corresponding to said incoming wave when the delayed replica fed thereto is coherent with an element of the received cross-modulation products.

7. The system of claim 6, further including variable delay means connected to each of said correlators, said variable delay means being adjustable to control the phase relationships of the output signals from said correlators, whereby the directional sensitivity of said listening bema can be controlled.

8. The system of claim 6, wherein said means for feeding a differently delayed replica of said noise signal to each of said correlators includes a plurality of delay networks, the delay time of each network corresponding to the time required for said projected noise signal to travel from said means for projecting to a selected segment of said volume of interaction and thence to said receiver means, and each delay network having a different delay time to thereby correspond to a different segment of said zone of interaction, whereby each said segment acts as an element of a virtual receiving array.

9. The system of claim 8, wherein said means for feeding a differently delayed replica of said noise signal to each of said correlators further includes means for supplying said noise signal simultaneously to each of said delay networks and means for feedng the delayed replicas of said noise signal produced by each delay network to corresponding one of said correlators.

10. The system of claim 9, further including a plurality of variable delay networks, each of said variable delay networks being connected to a corresponding one of said correlators and being adjustable to control the phase relationships of the output signals from said correlators, whereby the directional sensitivity of said listening beam can be controlled.

11. The virtual array of claim 10, further including summing mmeans for adding the output signals from said correlator to produce a single output corresponding to said incoming signal.

12. The system of claim 10, wherein the time delay of each of said variable delay networks is individually adjustable too control the phase relationships of the output signals from said correlators, whereby the direction of maximum sensitivity of said system can be varied.

13. The system of claim 8, wherein the cross-modulation products produced at a given one of said segments includes as a component thereof said noise signal, said noise component of said received cross-modulation products being correlated with the delayed replica that is produced by the delay network corresponding to said given segment, whereby the crossmodulation products from said given segment can be isolated.

14. The system of claim 13, wherein the cross-modulation products produced at said given segment include as components thereof signals representing the sum of said noise signal and said incoming wave and the difference between said noise signal and said incoming wave, said sum and difference signals appearing at the output of the correlator in which the noise component of said received cross-modulation signal is coherent with a delayed replica of said noise signal.

15. The system of claim 6, further including:
 a. second means for generating a substantially random acoustic wave noise signal distinct from the first said noise signal;
 b. second means for projecting said second noise signal in a direction to intersect said incoming waves, said second projected signal forming a second listening beam divergent from the first said listening beam and defining a second volume of interaction wherein the simultaneous propagation of said second projected signal and said incoming waves produces second cross-modulation products;
 c. second receiver means for receiving said second cross-modulation products, said second receiver means including a second plurality of correlators;
 d. second means for feeding said received second cross-modulation products simultaneously to said second plurality of correlators; and
 e. second means for feeding to each of said second plurality of correlators a differently delayed replica of said second noise signal for comparison to said second cross-modulation products, each of said second plurality of correlators producing an output signal corresponding to said incoming wave when the delayed replica fed thereto is coherent with an element of the received second cross-modulation products, whereby the outputs from said first and second correlators may be cross correlated to obtain said incoming signal.

* * * * *